No. 684,208. Patented Oct. 8, 1901.
S. EVANS.
PREPARING SURFACES FOR ENGRAVING BY SAND BLAST OR ACID ETCHING PROCESS
AND IN ENGRAVING SUCH SURFACES.
(Application filed July 20, 1896.)
(No Model.)

Witnesses:
R. J. Jacker,
J. H. Harrison,

Inventor:
Samuel Evans,
By Brown & Brown,
Attys.

UNITED STATES PATENT OFFICE.

SAMUEL EVANS, OF CHICAGO, ILLINOIS, ASSIGNOR OF ONE-HALF TO CHARLES L. RAWSON, OF SAME PLACE.

PREPARING SURFACES FOR ENGRAVING BY SAND-BLAST OR ACID-ETCHING PROCESS AND IN ENGRAVING SUCH SURFACES.

SPECIFICATION forming part of Letters Patent No. 684,208, dated October 8, 1901.

Application filed July 20, 1896. Serial No. 599,921. (No specimens.)

*To all whom it may concern:*

Be it known that I, SAMUEL EVANS, residing at Chicago, in the county of Cook and State of Illinois, have invented certain new and useful Improvements in Preparing Surfaces for Engraving by the Sand-Blast or the Acid-Etching Process and in Engraving Such Surfaces, of which the following is a specification.

This invention relates to the preparation of surfaces to be submitted to the sand-blast or the acid process for the purpose of obtaining an uneven and partial blasting or an uneven and partial blasting and partial etching thereof, as hereinafter more fully set out, or a partial etching of such surface and the consequent production of figures or designs on the surface, which in the present instance is shown as the surface of a material subject to the passage of actinic rays, as glass—that is, subject to the passage of rays producing chemical action upon properly-sensitized material after they have passed through the sheet or plate the surface whereof is covered with such coating of sensitized material.

Figure 1:
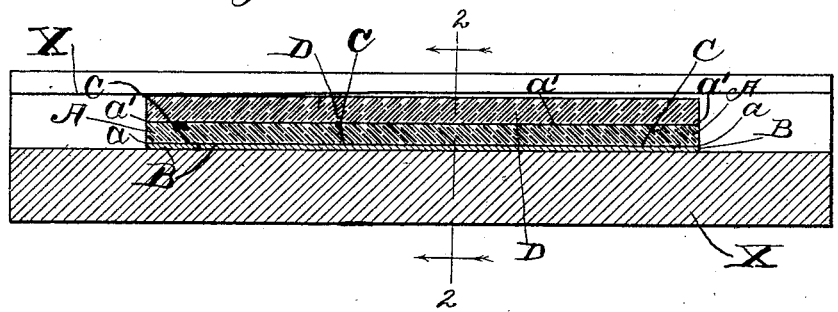

In the drawings accompanying this specification and forming a part hereof, Figure 1 is a sectional view, on line 1 1 of Fig. 2 viewed in the direction indicated by the arrows, of a pattern, which may be a "photographic negative," which term is hereinafter intended to include all patterns, whether positive or negative, obtained by the use of photography, placed upon a sheet of material one surface of which is to be prepared for subjection to the sand-blast in a sand-blast machine or to an acid process and a coating of material on the surface to be so prepared; and Fig. 2, a sectional view of the several parts illustrated in Fig. 1 on line 2 2 of such figure, viewed in the direction indicated by the arrows.

A reference-letter applied to indicate a given part is used to designate such part throughout both figures of the drawings wherever the same appears.

In the practical carrying out of the invention I have heretofore used a sheet of glass A, which may be clear or colored glass, as the material, one of the surfaces whereof is to be ornamented thereby. Where the surface *a* of sheet A is to be ornamented by the sand-blast process and by such process only, such surface *a* is coated or covered with material B, sensitized to actinic rays, which is allowed to set (in a dark room) sufficiently to permit of its being handled freely. Where surface *a* is to be ornamented by submission to clear acid in addition to the sand-blast process, an acid-resist C, which will not materially resist the passage of actinic rays, (or the sand-blast,) is spread on such surface *a* and allowed to dry before such surface is covered with the coating B of sensitized material, as described. Where white acid is used on the glass instead of the sand-blast, the acid-resist coating (of varnish) is not to be used. After the coating of sensitized material has become set I then place a pattern D on the uncoated surface *a'* of the sheet A, or before such sensitized material is placed thereon I make, transfer, paint, or photograph directly on such surface the figure or design forming the pattern to be reproduced. I then expose the side or surface of coating B, which is adjacent to or in contact with the surface *a* of sheet A, to actinic rays which have passed through or by the pattern D and through the sheet A (and through the acid-resist C, if it be used) into such coating of sensitized material.

Figure 2:
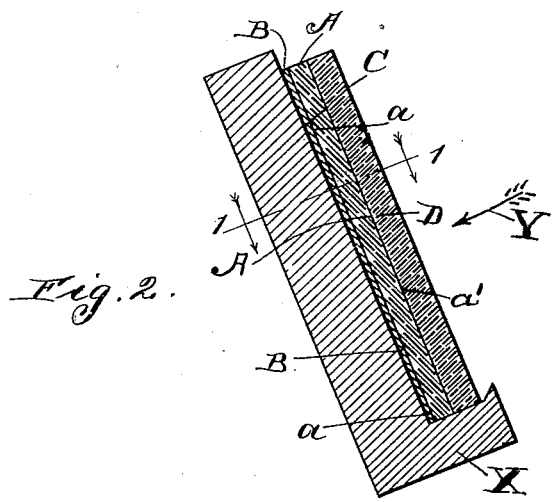

X is the support on which sheet A and pattern D may be held while exposed to actinic rays extending in the direction indicated by the arrow lettered Y in Fig. 2. After the proper exposure of the coating B has been made, as described, the part of such coating unaffected by the actinic rays is washed or dissolved off from such sheet A and the portion of the coating remaining on the sheet is dried or allowed to dry. I then toughen or otherwise change the character of such coating B by the addition or application thereto of glycerin, preferably by submission thereof to a bath of water having in solution about five per cent., in quantity, of glycerin, and in drying or allowing such coating to again dry, whereby a good sand-blast resist is made of such coating B, which will endure for days in proper condition for submission to the sand-blast process. I now submit the sheet of glass with the sensitized coating remaining on the glass (obtained as described and made a sand-blast resist, as stated) to the action of the sand-blast, (or to the action of white acid) with such sensitized coating interposed between the glass and the sand-blast, (or between the glass and the white acid.) When this has been done, it will be found that the glass has been roughened to correspond exactly with the pattern used. I have found any clear commercial varnish used, as the acid-resist and non-sand-blast resist C, to answer the purpose sought. In practice I have found that the time of the exposure of such sensitized surface to an arc-lamp rated at twenty-five thousand to thirty thousand candle-power is from five to ten minutes, varying according to the age of the coating of sensitized material and the temperature and humidity of the atmosphere, and from one to five minutes to the sunlight.

The material which I find best adapted for use as the covering B of surface a is gelatin, sensitized by bichromate of potash or bichromate of ammonia or other like material in the ordinary way of sensitizing gelatin films or coatings for "half-tone" work, as it is known in the art of engraving, where the films or coatings are to be exposed to actinic rays under a photographic negative, such sensitized gelatin having, where the actinic rays used are generated by the electric-arc lamp, sufficient glycerin therein (say from four (4) to ten (10) per cent.) to prevent flaking or peeling thereof when exposed to an arc-lamp, and thereby slightly heated.

I have obtained excellent results by substituting a good quality of glue for the gelatin in the sensitized material B—that is, by the use (mixed with water) of glue, glycerin, bichromate of potash, and aqua-ammonia, in the following proportions: water, one gallon; gelatin or glue, three and one-half pounds; glycerin, four ounces; bichromate potassium, one and one-half to four ounces; aqua-ammonia, two ounces. I do not confine myself, however, to the use of either glue or glycerin for this coating B or to the use of bichromate of potash for sensitizing such coating, as any other compound, which is properly sensitized to be so affected by the action of actinic rays on exposure thereto as not to be soluble, while when unexposed to actinic rays it is soluble, and which is or which can be made after having been exposed to the light under a pattern and the unaffected part or portion washed or dissolved therefrom a sand-blast resist, can be substituted for the glue or glycerin and bichromate of potash.

The pattern D may be a painting on glass, or a pen-and-ink design, or cut from paper, or a combination of any or all of the above, or it may be a photographic negative of any of the named patterns or photographic negatives of persons or things from "nature," as it is termed.

I prefer to have pattern D on a sheet of some material, as glass, through which actinic rays can pass, which is independent of and separable from sheet A, because in such case the pattern can be used repeatedly for as many reproductions thereof as desired; but the pattern may be placed or photographed directly on surface a' of sheet A.

I have heretofore used an electric-arc lamp for generating the actinic rays required, and I find by so doing that in linework—that is, where the pattern is drawn or otherwise made by combining lines (or is a photographic negative of such a pattern)—sharp well-defined lines are obtained in the sensitized material B at the point of contact thereof with the surface a of sheet A, although the thickness of such sheet, which may be considerable, as I have repeatedly used plate-glass therefor, is interposed between the sensitized material B and the pattern D, as described, and where the pattern is obtained by photography the lights and shadows obtained in the sheet A after the same has been submitted to the sand-blast process, with the pattern D transferred in relief to the material B, as described, conform to those of the pattern.

By this process of preparing surfaces for exposure to the sand-blast process, (or to the acid process,) which is particularly well adapted for use in sand-blasting on glass, I am able to produce at a cost rendering the product commercially available sheets of glass ornamented by having ground thereon photographs of persons, engravings, landscapes, and drawings, (or reproductions thereof,) with the lights, shades, and shadows artistically reproduced in conformity with the subject-matter sought to be reproduced.

Satisfactory results are uniformly obtained where a large number of copies of the pattern are desired without reference or attention to the fact that the coating of sensitized material B is or may be carelessly spread on with a brush or flowed on while in a heated condition, as in my process such coating is not required to be of uniform thickness and also without regard to the fact that the surface of glass of the kind and quality frequently used in the practical embodiment of my invention is uneven and slightly curved, so that the coating B is, when first applied, of varying thickness to an extent rendering it impracticable to obtain the necessary effect on such coating by directing (in linework) actinic rays thereinto from the surface thereof not adjacent to the sheet or plate A, it being observed that when the pattern is a photographic negative from nature it is impossible to obtain the result necessary in coating B by directing actinic rays through the pattern and into the sensitized material from the back thereof—that is, by placing the pattern in contact with the sensitized coating B—in the ordinary way of photographing or zinc-etching.

In the practice of this process it will be found that as the actinic rays enter the sensitized material B from the side thereof adjacent to the surface $a$ of sheet A after having passed through such sheet A and through the acid-resist, if one be used, such rays will penetrate and render insoluble the sensitized material to a depth in direct conformity with the lights and shades of the pattern, and if there be sufficient thickness to the coating formed by such material the actinic rays passing with the least possible resistance through the pattern D will so affect the sensitized material as to obtain (when washed as hereinbefore described and then toughened by the use of glycerin) a practical blast-resist, and it will also be found that such sheet A, in the parts thereof corresponding with the parts of the pattern permitting unobstructed passage of actinic rays through the pattern, will not be affected by the sand-blast and will remain clear surfaces after passing through the sand-blast. Also it is to be understood that the actinic rays passing through the pattern D in the parts thereof having the heaviest shades, if any such rays do so pass, will first affect the surface of the sensitized coating B, which is in contact with surface $a$ of sheet A, and hence if a photographic negative be used as a pattern (or if any pattern be used permitting the passage of some actinic rays through the parts thereof in deepest shade or shadow) a thin film of the sensitized coating will be affected thereby over the entire surface of sheet A, and all the variations in the resistance of the pattern to the passage of actinic rays will be accurately recorded in such sensitized material.

The effect referred to on the sensitized material B by the actinic rays is the ordinary one of rendering the portions thereof exposed to actinic rays insoluble, or nearly so, while the portions not exposed to such rays are readily soluble and easily washed (or dissolved) away in a bath, leaving the affected part or portion adhering to the sheet A; but such affected part or portion of the coating B which remains on the sheet A is not a good blast-resist for any great length of time after it has been washed, as when it becomes dry (which must in practice occur before it is submitted to the sand-blast) it is so hard that it is readily cut away by the sand-blast in the sand-blast process, and hence to change the character of the dry and hardened coating from a non-blast-resist to what is technically known as a "blast-resist"—that is, to a coating which will remain for an indefinite time, either hours or days, in condition not to be materially affected by the sand in a sand-blast—it is necessary to subject such sheet A, with the coating B thereon, prepared as described and forming a design in relief, to a glycerin-bath, as hereinbefore set forth, and to then allow such coating B to dry, or to dry such coating, as hereinbefore stated. The coating B not being just before its subjection to the glycerin-bath what is known in the art as a "sand-blast resist" and its effectiveness for a considerable length of time thereafter as a sand-blast resist being imparted thereto by the absorption of glycerin in such bath, it occurs that the time and extent of drying of the coating B after its subjection to the glycerin becomes a practical question to be determined by one skilled in the art, but depending in a general way upon the thickness of the film of affected sensitized material forming the coating B. Means are thus afforded in this process for meeting the exigencies arising from varying conditions of the pattern D, where the same is obtained by photography, from the varying action of chemicals, varying temperature, and varying lights in preparing the sheet of glass for the sand-blast process, as well as the variations of temperature and humidity at the time of the subjection of such sheet of glass to the sand-blast, and for thus obviating the difficulties attending the practical carrying out of the process.

In a pattern obtained by painting on glass or by covering the glass with paper and cutting a pattern therethrough actinic rays have either unobstructed passage through the pattern or are prevented entirely from passing therethrough. It thus occurs that with the use of such patterns the sensitized material B is either uniformly affected or not at all affected by actinic rays, and hence the coating B will not extend entirely over the sheet A after washing or dissolving the unaffected portion thereof from off such sheet; but such parts of such sheet A as are not covered by the pattern when the same is exposed to the actinic rays will be covered by a coating of such sensitized material, and no other parts of the sheet will have sensitized material thereon. Owing to this fact, when no acid resist is spread on the sheet A before covering it with the sensitized material and such patterns are used white acid may be applied directly to the sheet A, (on the parts thereof not covered by coating B), and hence the ordinary white-acid-etching processes may be applied to the sheet A instead of the sand-blast process, the sensitized coating being a sufficient resist for this acid so applied.

The sheet A after having been sand-blasted or etched by white acid to render permanent the designs produced by this process is valuable for ornamental and other purposes, and I have also used such sheets A (after the same have been sand-blasted or sand-blasted and etched) as type or plates for printing.

The preparation and submission of a plate or sheet of glass to the sand-blast process after the surface $a$ has been prepared therefor, as hereinbefore stated, is the principal purpose of this invention, and in order that the action of the sand-blast may be well understood it will be observed that the surface of the sheet A having the coating thereon obtained by the sensitized material B is the one that is exposed to the action of the sand in such sand-blast process, and when such exposure of sheet A to the sand-blast has been made it will be found that the sand driven by the force of the sand-blast machine has thoroughly and effectually ground or engraved the portion (if any) of the surface of such sheet A from which the sensitized material had been entirely washed away and has not ground at all the portion of the surface of such sheet A on which a coating of considerable depth of such sensitized material remained, (had not been washed away,) such portion of the sheet being thereby completely and effectually protected from the action of the sand-blast, and therefore remaining clear glass, while such portion (if any) of the sheet A covered by a thin coating of such sensitized material will be found to have been partially ground or engraved, such grinding or engraving being proportionate to and corresponding with the depth of the coating of sensitized material. In other words, the coating of sensitized material in its various depths as obtained by the hereinbefore-described process of preparing the sheet for the sand-blast or acid process bears such a ratio to the force of the sand-blast or the sand driven by the blast that such sand penetrates the coating and grinds the surface of the sheet A beneath the coating in inverse proportion to the amount of obstruction offered by pattern D to the passage of actinic rays. The sheet A will therefore be found to have been engraved or etched by the sand-blast with the exact reproduction of the pattern D used, and where a photographic negative from nature is employed as such pattern D even the most delicate shading of the pattern will be preserved, the work being clear and distinct and of a highly-ornamental character, regardless of the variation of thickness (if any) of the sensitized material B when first applied to surface $a$ and also regardless of the variation of flatness (if any) of the surface $a$ of sheet A.

When it is desired to use sheet A, engraved as described, for printing or lithographing, I have found it necessary to use plate-glass of as uniform and perfect a surface as can be obtained. French or American plate-glass is the material which I have thus far found the most suitable. The sheet of glass A is submitted to the sand-blast and then to the action of hydrofluoric acid or to the action of such acid without submission thereof to the sand-blast when it is desired to give a different character to the work (or engraving) done on sheet A from that produced by the sand-blast process, or it may be used in photographic work to modify the action of the sand-blast process by deepening the roughening, in which latter case the sheet A, with the partial coat of sensitized material thereon, (as the same is left after sheet A has passed through the sand-blast and having an acid resist interposed between the sheet A and the coating of sensitized material,) is submitted to the action of the acid after having passed through such sand-blast and before the removal of the sensitized matertial thereon remaining. Such hydrofluoric acid should, for the purpose last named, be diluted with water, (then known as "clear" acid.)

White acid (hydrofluoric acid having digested therein carbonate of ammonia) treatment may be used in line-work as a substitute for the action of the sand-blast process, (the sheet A not being at any time submitted to the sand-blast process.) In such case the step in the preparation of coating B, consisting of the final application of glycerin thereto, may be omitted.

When the sheet A has been completely ornamented, the sensitized material remaining thereon is cleaned therefrom.

While I have in the foregoing specification elaborated the details employed in carrying out my invention, it will be understood that said details are capable of modification and that I do not desire to be limited in the interpretation of the following claims except as may be necessitated by the state of the prior art.

What I claim as new, and desire to secure by Letters Patent of the United States, is—

1. In the art of ornamenting glass, or similar substances, the process which consists in passing actinic rays through or by a pattern, through a sheet of glass, and into a sensitized coating placed on the other side of the sheet of glass from that on which the pattern is placed; in then washing out the unhardened portion of said coating; in then eroding the surface of the glass on which the sensitized coating is placed to a depth varying with the protection afforded by the hardened portion of the sensitized coating; and in then removing the remaining portion of the coating.

2. In the art of ornamenting glass, or similar substances, the process which consists in passing actinic rays through or by a pattern, through a sheet of glass, and into a sensitized coating placed on the other side of the sheet of glass from that on which the pattern is placed; in then washing out the unhardened portion of said coating; in then adding some material, such as glycerin, to the hardened portion of said coating in order to make it a sand-blast resist; in then sand-blasting the surface of the glass on which the sensitized coating is placed to a depth varying with the protection afforded by the remaining portion of the sensitized coating; and in then removing the remaining portion of the coating.

3. In the art of ornamenting glass, or similar substances, the process which consists in covering one side of a sheet of glass with a sensitized coating, such as gelatin; in then placing a pattern, such as a photographic negative, on the other side of the sheet of glass; in then passing actinic rays through or by the pattern, through the sheet of glass, and into the sensitized coating to a depth varying with the resistance offered by the pattern; in then washing out the unhardened portion of said coating; in then eroding the surface of the glass in which the sensitized coating is placed to a depth varying with the protection afforded by the hardened portion of the sensitized coating; and in then removing the remaining portion of the coating.

4. In the art of ornamenting glass, or similar substances, the process which consists in covering one side of a sheet of glass with a sensitized coating, such as gelatin; in then placing a pattern, such as a photographic negative, on the other side of the sheet of glass; in then passing actinic rays through or by the pattern, through the sheet of glass, and into the sensitized coating to a depth varying with the resistance offered by the pattern; in then washing out the unhardened portion of said coating; in then adding some material, such as glycerin, to the hardened portion of said coating in order to make it a sand-blast resist; in then sand-blasting the surface of the glass on which the sensitized coating is placed to a depth varying with the protection afforded by the remaining portion of the sensitized coating; and in then removing the remaining portion of the coating.

5. In the art of ornamenting glass, or similar substances, the process which consists in covering one surface of a sheet of glass with a coating composed of glue, bichromate of potassium, glycerin and aqua-ammonia in the proportions specified; in then placing a pattern, such as a photographic negative, on the other side of the sheet of glass; in passing actinic rays through or by the pattern, through the sheet of glass, and into the sensitized coating to a depth depending on the resistance offered by the pattern; in then washing out the portion of the coating which is unaffected by the actinic rays; in then applying glycerin to the coating remaining on the plate; and in then subjecting the sheet of glass to the action of the sand-blast so as to grind it to a depth varying with the protection afforded by the remaining portion of the coating.

6. In the art of ornamenting glass, or some similar substance, the process which consists in passing actinic rays from a powerful arc-light through or by a pattern, through a sheet of glass, and into a sensitized coating arranged on the side of the sheet of glass opposite to the side on which the pattern is placed; in then washing out the portion of the coating unaffected by the actinic rays; in then eroding the surface of the glass on which the sensitized coating is placed to a depth varying with the protection afforded by the crystallized portion of the sensitized coating; and in then removing the remaining portion of the coating.

7. In the art of ornamenting glass, or similar substances, the process which consists in covering one surface of a sheet of glass with a sensitive coating composed of glue, bichromate of potassium, glycerin, and aqua-ammonia in the proportions specified; in then placing a pattern, such as a photographic negative on the glass, on the other side of the sheet of glass; in passing actinic rays through the pattern, through the sheet of glass, and into the sensitized coating to a depth depending on the resistance offered by the pattern; in then washing out the portion of the coating which is unaffected by the actinic rays; in then placing the sheet of glass in a solution of glycerin of the strength specified to make the coating a blast resist; in then subjecting the sheet of glass to the action of the sand-blast so as to grind it to a depth varying with the protection afforded by the remaining portion of the coating; and in then removing the remaining portion of the coating.

8. In the art of ornamenting glass, or similar substances, the process which consists in covering one surface of a sheet of glass composed of glue, bichromate of potassium, glycerin, and aqua-ammonia in the proportions specified; in then placing a pattern, such as a photographic negative on the glass, on the other side of the sheet of glass; in passing actinic rays from a powerful arc-light at a distance therefrom through the pattern, through the sheet of glass, and into the sensitized coating to a depth depending on the resistance offered by the pattern; in then washing out the portion of the coating which is unaffected by the actinic rays; in then placing the sheet of glass in a solution of glycerin of the strength specified to make the coating a blast resist; in then subjecting the sheet of glass to the action of the sand-blast so as to grind it to a depth varying with the protection afforded by the remaining portion of the coating; and in then removing the remaining portion of the coating.

SAMUEL EVANS.

In presence of—
  NICHOLAUS T. NILSSON,
  HENRY C. HUXHOLD.